United States Patent [19]

Shindell

[11] 4,328,084
[45] May 4, 1982

[54] APPARATUS FOR THE TREATMENT OF WATER

[76] Inventor: Herman A. Shindell, 1081 N. Shepard St., Anaheim, Calif. 92806

[21] Appl. No.: 223,357

[22] Filed: Jan. 8, 1981

Related U.S. Application Data

[62] Division of Ser. No. 933,163, Aug. 14, 1978, Pat. No. 4,263,114.

[51] Int. Cl.³ ............................................. C25B 15/02
[52] U.S. Cl. .................................. 204/228; 204/237
[58] Field of Search ............... 204/149, 152, 228, 237, 204/238, 240; 210/416.2

[56] References Cited

U.S. PATENT DOCUMENTS

| | | | |
|---|---|---|---|
| 3,092,566 | 6/1963 | Negus | 204/149 |
| 3,192,146 | 6/1965 | Vellas et al. | 204/149 X |
| 4,038,163 | 7/1977 | Casanovas et al. | 204/149 X |
| 4,085,028 | 4/1978 | McCallum | 204/149 X |

Primary Examiner—T. M. Tufariello
Attorney, Agent, or Firm—Grover A. Frater

[57] ABSTRACT

Water purification is accomplished in a swimming pool, spa or decorative pool body of water by adding salt in quantities sufficient to make the water slightly conductive and by circulating that water through the electric field between a pair of electrode plates where the dissociated ions of salt and water are converted to oxidizing agents capable of destroying organic matter and are converted to substances that can be removed in such a mechanical filtration system. That process results in economical and effective purification which is augmented in one form of the invention by the inclusion in the water circulation path of dissimilar metals which aid in the destruction of organic matter. The process is facilitated by the use of a special electrochemical processing unit in which the electrode dissociation is accomplished.

7 Claims, 7 Drawing Figures

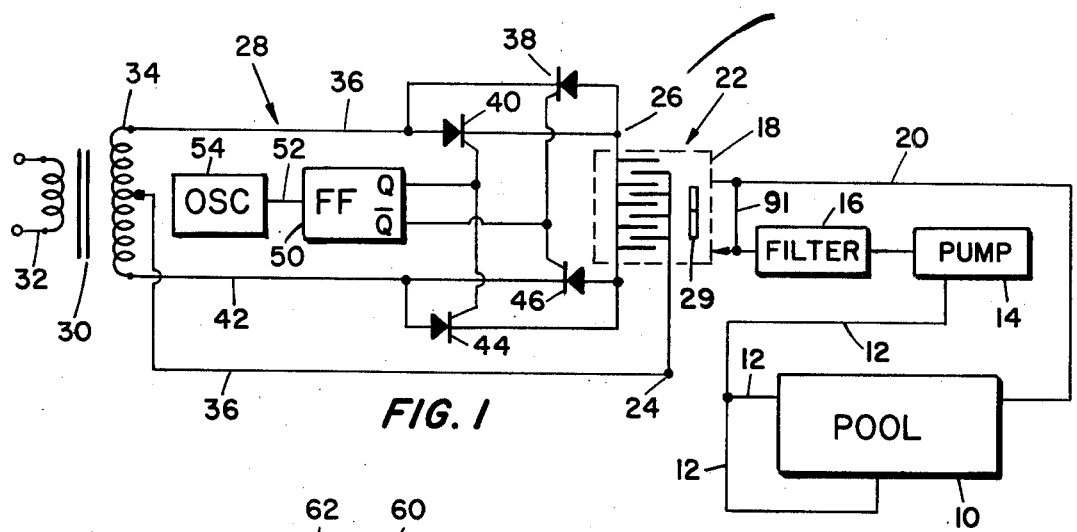
FIG. 1
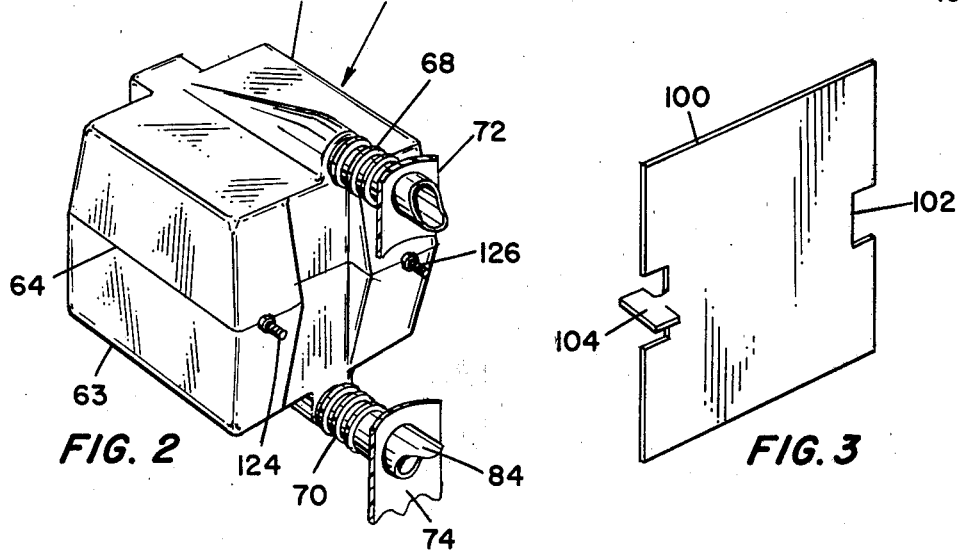
FIG. 2
FIG. 3
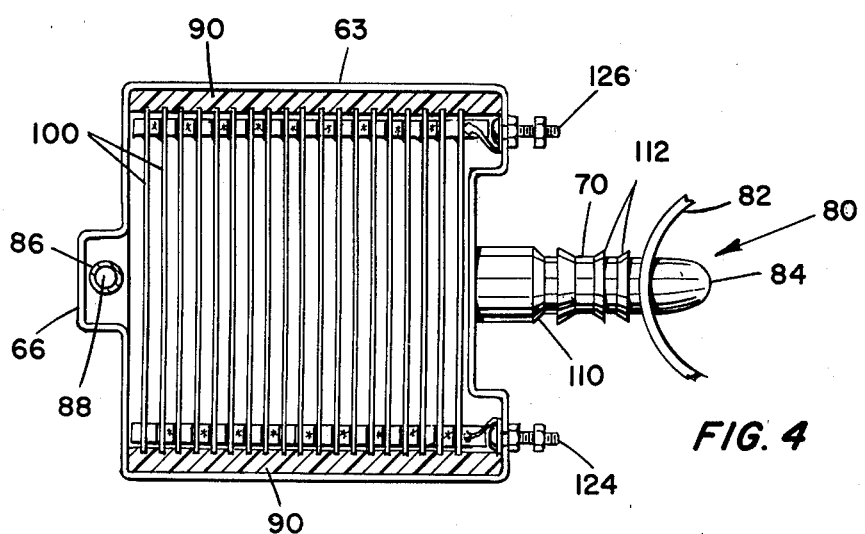
FIG. 4

APPARATUS FOR THE TREATMENT OF WATER

This is a division of application Ser. No. 933,163 filed Aug. 14, 1978, now U.S. Pat. No. 4,263,114.

This invention relates to methods and apparatus for treating water, particularly the water of swimming pools and spas.

BACKGROUND OF THE INVENTION

While the invention is applicable to the purification and treatment of water in general, it is particularly applicable to the treatment of water in pools, spas, and in confined ponds where the same body of water is retained, often for periods of many years, without replacement except for the addition of water to compensate for evaporative loss. Thus, the invention is applicable to the maintenance of purity and sanitary conditions within decorative pools and lagoons and recirculating fountains, and in swimming pools and spas.

Water treatment in that application ordinarily consists of a combination of chemical treatment and mechanical filtering. Filtering is accomplished by drawing a stream of water from the pool, usually with a centrifugal pump, forcing it through a mechanical filtering bed and returning the water to the pool. That kind of circulation system is provided primarily to accomplish filtering, but availability of the system makes it convenient to include a facility for heating the water in that same circuit. The existence of a circulation system makes it easy to accomplish chemical treatment. It is necessary only to add a quantity of treatment material in liquid or soluble form, and the circulation system will soon ensure adequate dispersal of the treatment material.

In most cases, the primary purpose for water treatment is to destroy the living bacteria and algae material. That can be done by adding oxidizing agents such as chlorine, iodine and oxygen, and by the addition of certain metallic ions. The addition of copper ions is well known as an aid in destroying algae. The addition of silver ions is well known as an aid to killing bacteria. The most widely used agent for destroying bacteria and algae is chlorine. Chlorine is gaseous at ordinary temperatures and it is not generally available, and is difficult to handle as a gas. As a consequence, the chlorine that is used in pool and pond water treatment is included as a constituent of some compound which is made to dissociate after addition to the pool or pond water. Chlorine is often introduced as a constituent of calcium hypochlorite, a popular form of which is sodium dichloro-S-triazinetrione, sodium hypochlorite and chlorinated isocyanurates, or some other acid, or as a salt. If it is introduced as part of a salt, it is usually required to add additional materials to avoid accumulations of the other constituent in the salt. The result is that the treatment of the water in most pools and ponds becomes a problem of chemical balance requiring the addition of chemicals to counteract the effect of the addition of other chemicals. The amount of chlorine or other agent that is required varies from time to time with the amount of usage in the case of swimming pools and spas, and with seasons and holiday activities in the case of decorative pools and fountains which are frequented by birds and windborne living matter, or which become the receptacle for the used food containers and cigaret remains and the like.

SUMMARY OF THE INVENTION

It is an object of this invention to provide a simplified method for treating the water of pools and ponds to destroy bacteria and algae and other rudimentary life forms, and it is an object to provide that kind of treatment in a manner that minimizes the problem of maintaining an adequate chemical balance within the body of water.

A further object is to provide those advantages in a way that is practical and relatively inexpensive. The invention provides a new approach to water treatment in that it relies on electrochemistry. Common salt, usually a mixture of sodium chloride and other salts, is added to the water of the pool, spa or lagoon in quantities sufficient to make it electrically conductive. The salt is dissolved and forms dissociated chlorine and sodium and other ions. The water thus prepared is passed between electrically charged plates and the ions are permitted to migrate to electrode plates which are chemically inert. The negative chlorine ion gives up an electron at the positively charged plate, and is converted to chlorine gas which is entrained in the water and is available to destroy bacteria and algae and other organic materials. There is a dissociation of water at the opposite plate where some free oxygen is formed and where the metallic ions combine with an oxygen/hydrogen group and other elements eventually to form precipitate which are readily removed by the mechanical filtering unit. The free oxygen is available as an oxidizing agent to aid in the task of destroying organic matter.

The addition of electrodes and the task of energizing them is relatively simple. Since almost all systems include an electrically powered pump to force water through the mechanical filtering system, electrical energy is available in the immediate vicinity of the point at which electrochemical action is most advantageously conducted. The preferred point at which to practice the electrochemical steps of the process is immediately downstream from the mechanical filter, either before or after the water heating unit, if there is one, and in most installations that will be in close proximity to the pump motor and its electrical supply conduit.

It is possible to practice the method of the invention and to utilize its apparatus in a way that treats all of the water that flows through the pump and the filtering system, but that is not necessary except in those instances where an extraordinary amount of organic matter finds its way into the pool. In most applications, and in particular in the case of the private swimming pool, it is adequate to electrochemically treat only half or less of the volume of water that is made to flow through the mechanical filter.

The embodiment of the invention that is considered to be the preferred form of the invention is arranged so that its electrochemical processing unit can be added to an existing pool water circulation unit simply by forming two holes in a system flow pipe which are spaced some predetermined distance to receive the inlet and outlet elements of a housing in which a number of plates are arranged in a water flow path such that they can be electrically charged in pairs to form an electric field through which the water must pass. In the preferred embodiment, that housing unit with its inlet and outlet elements is simply clamped to the flow conduit in which the holes are formed. However, the inlet and outlet conduit elements are arranged so that they can be severed midway along their length. One portion of each conduit remains with the electrochemical processing unit and the other remains with the attaching element that is connected to the flow conduit. They are provided with conformations that serve to retain lengths of hose or other flexible conduits in place with conventional hose clamps. Thus, it is possible to remove the electrochemical processing unit from the flow conduit if that appears to be advantageous in a particular installation.

It is known to place copper and silver plates, and plates of other metals, in a water flow path and to connect them to a source of potential so that an electric field is formed between the plates. Doing that will result in loss of some of the copper and silver to the water as free ions where they are effective to chemically modify organic matter and effectively destroy it as a health hazard in the water. It is a feature of this invention that quantities of such metals, and particularly the metals copper and silver, be included in the flow path so that they will dissociate and contribute metallic ions to the water. However, that material is used in a different fashion than has been true in the past. In the invention, a quantity of silver and a quantity of copper are joined together, and they are placed in the flow path without any need to have direct electrical connection to a voltage source. These two metals are dissimilar such that a potential will be developed across the junction that joins them. That junction potential will be small but adequate nonetheless in a water environment in which the water is lightly salty, to permit a current flow through the water between the copper and silver, and that process will result in the release of ions. In fact, several electrochemical processes are manifest in that situation so that ions will actually be released from both quantities of metal notwithstanding that current flow, as a consequence of the junction potential, is limited to flow in one direction.

The rate of depletion of the silver and copper can be controlled to some extent by arranging those materials so that they lie in an electric field such that there is a potential gradient between them. In the invention, the polarity of the field that is used to generate free oxygen and hydrogen through electrolytic action is reversed periodically. That means that the field in which the quantities of silver and copper find themselves is reversed whereby there is a modification of current flow sufficient to ensure that both metals are dissolved with time.

In the preferred embodiment of the invention, the plates between which the electrochemical action is encouraged are made of a chemically inert substance and the preferred electrode material is one which is chemically inert. Platinum is the best material, but that is impractical because of its cost. A material that is almost as good and which is practical on a cost basis is titanium. Pure titanium is preferred.

DESCRIPTION OF THE DRAWINGS

In the drawings:

FIG. 1 is a diagram of a water treatment system embodying the apparatus of the invention and in which the method of the invention is practiced;

FIG. 2 is a pictorial view of an electrochemical processing unit employed in the invention;

FIG. 3 is a pictorial view of one of the titanium electrode plates that is employed in the unit of FIG. 2;

FIG. 4 is a top view of the apparatus of FIG. 2 with the upper portion of the housing cover removed;

DETAILED DESCRIPTION OF THE PREFERRED EMBODIMENTS

Figure 5:
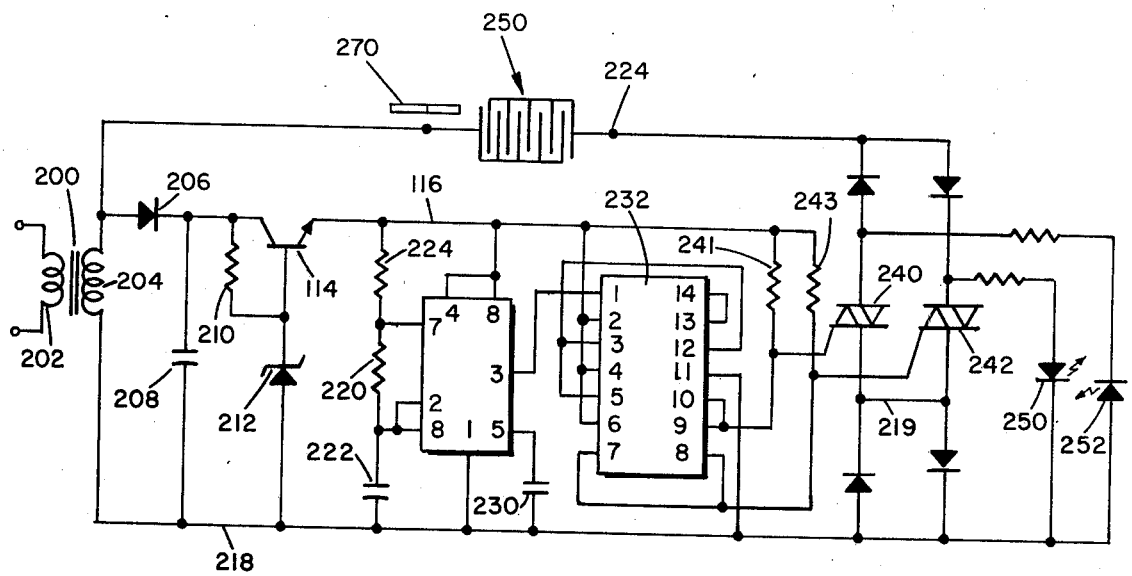
FIG. 5 is a circuit diagram of a preferred form of electric field generating unit for use in the invention.

In FIG. 1, the block 10 represents a pool or pond of water from which water is drawn through lines 12 by a centrifugal pump 14. The pump discharge flows through a mechanical filter 16 and through an electrochemical treatment unit 18 and then by line 20 back to the pool 10. The electrochemical treatment unit 18 comprises two main portions. The first is a metallic ion source 29 and the second is a collection of electrode plates which are arranged in pairs. The set of plates is generally designated by the reference numeral 22. Alternate plates of the set of plates are electrically interconnected. One set of those plates is connected to a terminal 24, and the other is connected to a terminal 26. Those terminals are part of a rectifier and rectifier control unit generally designated 28. It is formed by a transformer 30 whose primary winding 32 is arranged for connection to the same electrical source that powers the pump 14. The secondary winding 34 of the transformer is center tapped and the tap is connected by line 36 to the terminal 24. The ends of secondary winding 34 are connected to pairs of rectifiers. The upper end of winding 34 is connected by a line 36 to terminal 26 through a pair of silicon controlled rectifiers 38 and 40 which are connected in parallel.

The lower side of secondary winding 34 is connected by line 42 to circuit point 26 through the parallel combination of silicon controlled rectifiers 44 and 46. The rectifiers 38 and 40 are connected in opposite directions in terms of polarity as are rectifiers 44 and 46. Rectifiers 38 and 46 have their control electrodes connected together and both are connected to the NOT Q output terminal of a flip-flop 50. The Q terminal of that flip-flop is connected to the control electrodes of rectifiers 40 and 44. When a high signal appears at the Q output of the flip-flop, silicon rectifiers 40 and 44 are capable of conduction and they will conduct such that full wave rectification is accomplished. When the upper end of winding 34 is positive with respect to the center tap, current will flow from the upper end of the secondary winding through the rectifier 40 to circuit point 26 at one side of the load which, in this instance, is the capacitor formed by the set of plates 22. Current flows into that capacitor. The circuit is completed from the other side at circuit point 24 by its connection back to the center tap of the secondary winding. No current can flow from circuit point 26 back to the lower end of the secondary winding because, while rectifier 44 has a high signal on its control element, it is connected in the non-conducting direction. No current can flow through rectifier 46 because the signal on its control element is low. During the next half cycle, when the lower end of winding 34 is positive, current does flow through rectifier 44 to circuit point 26, and no current can flow through rectifier 40 because it is connected in the non-conducting direction of polarity, and no current can flow through rectifiers 38 and 46 because their control elements are connected to a low signal.

When the output signal of flip-flop 55 is reversed, a low appears at the Q output so that rectifiers 40 and 44 are turned off. Instead, a high signal appears at the NOT Q terminal. That high signal is applied to the control electrodes of rectifiers 38 and 46. They behave as a full wave rectifier, except that the rectified voltage has a polarity that is reversed.

Figure 7:
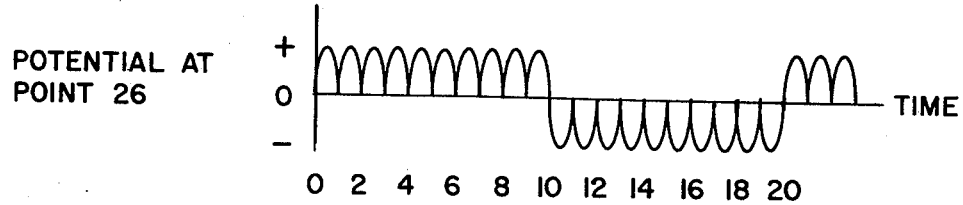

Flip-flop 50 changes its output signal condition in response to input signals applied to it by line 52 from an oscillator 54. The function of the oscillator is to generate input signals for the flip-flop at some selected frequency so that the rectifier set 40 and 44 will be operative for a period during which the rectifiers 38 and 46 will be inoperative. That is followed by a period in which rectifiers 40 and 44 are inoperative while rectifiers 38 and 46 are operative. The frequency of the output signal change from the flip-flop 50 is made less than the frequency of the power that is applied to the supply transformer 30. The result is a wave form similar to what is depicted in FIG. 7 where the interval between time 0 and time 20 represents one cycle of output signal activity in flip-flop 50. Twenty half-cycles appear in the interval from time 0 to time 20. In ten of those half-cycles, circuit point 26 is positive and then, after the flip-flop output changes, the potential at point 26 becomes negative and remains negative through the next ten half-cycles. In this case, the frequency of flip-flop reversal is one-fifth of the supply voltage frequency. In terms of cyclic operation, the flip-flop cyclical frequency is one-tenth of the supply frequency or, in the usual case where supply frequency is sixty cycles per second, flip-flop frequency is six cycles per second.

The reason for reversing the potential applied to the plates of the plate set 22 is that it serves to clean the set of electrode plates at which precipitates are formed during the process of dissociating the salt and the water. The method involves the addition of salt to the pool water. The elements of the salt are dissociated when the salt is dissolved. One of the products of that dissociation is a chlorine ion, and that ion is neutralized when it comes into contact with one of the plates of the plate set 22. Water is also dissociated to free oxygen to form a radical which combines with sodium to form a precipitate. The precipitate will ordinarily be deposited on the negatively charged plates of the plate set. That chemical action was explained above and is repeated here because it is necessary to understand that the process involves the physical movement of ions contained in the pool water flow so that they will migrate into contact with the plates. That process requires an appreciable length of time. In a practical system, plate separation must be great enough to prevent short-circuiting, and in that circumstance it is ordinarily not satisfactory to reverse plate potential at the common line frequency, 60 cycles per second. The plate polarity must remain unchanged for a time sufficiently long to permit migration of ions into engagement with the plates and to permit the resulting chemical and oxygen gas particles to migrate into contact with an organic element which is to be destroyed. In addition, some time is required after polarity reversal for the precipitate molecules to be released from the plates where they are formed. At maximum, the frequency of flip-flop reversal must be not more than half the frequency of supply power polarity reversal. The minimum frequency of flip-flop reversal is that frequency below which precipitate accumulations are not cleaned away at each reversal.

Reversal of the potential applied to the process electrodes 22 is important for another reason. The metallic element 20 of FIG. 1 is formed of a quantity of two dissimilar metals joined one to the other so that there is a junction potential gradient across their junction line. In preferred form, one of those materials is copper and the other is silver. They are arranged so that salt water is excluded from the immediate vicinity of the junction. Consequently, a field is made to exist that extends from one of the materials through the surrounding water to the other. The junction potential is small, and that field is weak. Nonetheless, it is adequate to ensure that there are metallic ions in the outer surface of each of the two layers. Actual release or dissociation of ions will occur at a very slow rate without the presence of a field, but the introduction of the electric field hastens that process so that enough ions are released to have a material and appreciable effect upon the organic substances contained in the water. That action proceeds whether or not there is another electric field source. However, in the preferred form of the invention, the electric field is established as described above between and around the several plates of the set 22. Ordinarily, the field between the plates is stronger than what is required or desirable to be used for dissociation for the materials in the member 29. However, in the region surrounding the plate set, there will be a weak electric field that will reverse direction, and it is in this field that the element 29 is placed. In the case of a swimming pool, it is common to use one and one-half inch diameter pipe and a centrifugal pump that moves forty to fifty cubic feet per minute of water. In such an installation, a suitable electrochemical processing unit would be formed by a housing measuring approximately four by four by six inches and containing ten to eighteen plates of titanium, each measuring about three and one-half inches on one side and four inches on another. The plates would be separated by 0.075 to 0.200 inches. In that circumstance, the member 29 would be formed of a copper rod two inches long and one-half inch in diameter joined at one end to a silver rod two inches long and one-third of an inch in diameter. The composite member would be encased in plastic, such as polypropolene plastic, in the region of its juncture so that a length of the member extending from three-eighths to one-half of an inch long at the region of its juncture sealed against entry of water. The unit is mounted so that the flow would extend in the direction of its length and it would be separated from the plates of the plate set 22 so that there is no direct electrical connection with a supply power source.

The preferred embodiment shown in FIG. 2 has that construction. The electrochemical processing unit thereshown includes a housing 60 which is formed by an upper section 62 and a lower section 63 which are joined together and sealed on a parting line 64. That side of housing 60 that is visible, and faces the lower-right corner, is called the front of the unit. It is fitted with two electrical terminals. One of those terminals extends from the housing half 62 and is identified by the reference numeral 126. The other extends from the lower housing half 63 and is identified by the reference numeral 124. There is a rectangular elongated protrusion 66 extending along the center region of a rear face and it is within that protrusion that the metallic ion generator member 29 is housed. The lower one is not entirely visible, but both the upper and lower ends of that housing 60 are formed with slanting protrusions that merge into an outlet conduit 68, in the case of the upper surface of the unit, and into an outlet 70 in the case of the lower surface of the unit. The outlet conduit terminates in an attachment structure which is identified as the attachment structure 72 associated with conduit 68 and the attachment 74 associated with the conduit 70.

Comparison of FIGS. 2 and 4 will show that those attachment structures comprise semi-circular plates which are arranged so that they will wrap partially around a one and one-half inch pipe. The opening in the conduit extends through that plate and a scoop or shield is formed partially around that opening as an extension of the conduit wall. The unit is arranged so that it can be mounted on a one and one-half inch conduit of the kind that is used in the construction of pool filtering systems. Two openings are bored in the wall of that conduit and they are spaced so that the scoops or shield portions of the attachment structures will fit into those bored openings. The plate portion of the attachment member is pressed against the conduit in the region around those bored openings and is held in place with conventional tubing clamps and a washer to seal which are not shown in the drawing. In FIG. 4, the attachment member associated with conduit 70 is identified, generally, by the reference numeral 80. It consists of the curved plate 82 and the scoop or shield 84. The upper and lower housing sections 62 and 63 are identical when first formed. A protective collar 86 that surrounds the ion generator member 29 is placed in the lower half section 63 as shown in FIG. 4. It is affixed to the interior surface of the rectangular bulge 66. The upper end 88 of the silver rod is visible in that figure.

The side walls of the housing member 63 are provided with U-shaped conformations 90 at each side into which the several electrode plates are placed. The electrode plates are all identical in configuration. One of them has been designated with the reference numeral 100 and that one is shown in FIG. 3. It has a notch 102 cut out of the edge of one of its longer sides. The edge of the opposite side of the plate is formed with a cutout shaped so that a portion of the plate mid-way along that edge is formed in the shape of a "T". That T portion, which is identified by the reference numeral 104, is then twisted out of the plane of the plate so that it lies almost at right angles to the plate. The plates are arranged in the housing so that the T-bar of odd numbered plates in the set extend to one side of the housing and so that the T-bar of the remaining plates extend to the other side of that housing. They are all assembled in respectively associated slots, and then the T-bars on one side are all spot welded one to the other. In like fashion, the T-bars on the other side of the unit are spot welded one to the other. The result is that there is an electrical interconnection between all of the plates whose T-bars lie on one side. The T-bar of each plate extends through the slots at the opposite edge of the adjacent plates. At the lower-right end in FIG. 4, a screw thread is welded to the T-bar of the plate at the end and that screw thread is connected to terminal 124. In like fashion, at the upper-right end a screw thread is welded to that T-bar and is connected to terminal 126.

The openings in which the terminal members 124 and 126 are disposed are formed in the housing at the time of molding, and they are both fixed to the composite housing at the parting line.

In FIG. 4, the conduit outlet 70 is shown to be formed with a number of conformations of the kind that are commonly formed on plastic pipe nipples and the like. Those conformations are designed to grip a hose that is forced over the end of the conduit. In this case, two of those conformations are identified by the reference number 110. They are formed on the side of the conduit 70 toward the housing section 63. The other two conformations, 112, are formed in the opposite direction and they are formed on the end of conduit 70 toward the attachment plate 82. Reference to FIG. 2 will show that the inlet conduit is similarly constructed. If it is not feasible to attach the whole unit to the conduit in the filtration system, and if it be required that the housing 60 be removed to some distance, then the structure is arranged so that it is necessary only to sever the inlet and outlet conduits 68 and 70 at the mid-region of their length. Thereafter, the portion of those conduits that remain with the housing can be interconnected with the portion of the conduit that remains with the attachment member by flexible hoses. One end of each hose is forced over the conformations that are formed on the portion of the conduit that remains with the housing, and the other end of each flexible conduit is forced over that section of respectively associated ones of conduits 68 and 70.

Conduit 91 is shown in FIG. 1 as a by-pass past the processing unit 28 to indicate that in some installations it is preferred to route only a portion of the circulating flow through the processor.

In practice, it is not essential that full wave rectification by employed in the unit that supplies energy to the electrochemical processing unit. Triacs sometimes cost less than silicon-controlled rectifiers so some cost saving is realized by substitution of triacs for the silicon-controlled rectifiers. That has been done in FIG. 5 and that embodiment is considered to be the preferred embodiment on the basis of costing less than the arrangement shown in FIG. 1. It costs less for the additional reason that a center tap transformer is not required. In FIG. 5, the transformer 200 has a primary winding 202 for connection to a power supply of suitable voltage, usually 110 volts. The secondary winding 204 is arranged to deliver a low voltage such, for example, as 12, 24 or 28 volts, to the remainder of the circuit. In this case, the secondary voltage is 28 volts. A diode 206 and a filter capacitor 208 are connected in series across that secondary winding. A resistor 210 and a Zener diode 212 are connected in series across the capacitor 208. Resistor 210 is connected across the collector to base circuit of a voltage regulating transistor 214. The emitter of that transistor is connected to line 116. The circuit is arranged so that a potential of about five volts positive appears at emitter connected to line 216. Thus it is that line 216 is at a positive five volt potential with respect to the negative line 218.

The circuit of FIG. 5 includes an oscillator of the kind which supplies output pulses during one-half of the oscillation cycle and supplies no output during the other half of the oscillation cycle. Such an oscillator is readily formed by the digital integrated circuit unit 555. That is a standard unit available from a number of manufacturers which will perform as an astable multivibrator when connected as shown. Its terminals 2 and 6 are interconnected and are connected to the junction of the resistor 220 and capacitor 222 in a series circuit that extends from positive line 216 to negative line 218 and includes, in order, a resistor 224, the resistor 220 and the capacitor 222.

The seventh terminal of the 555 timing device is connected to the junction between the two resistors 220 and 224. The terminals 4 and 8 are both connected to the positive line 216 and terminal 1 is connected to the negative line 218. Terminal 5 can be left unconnected, but stability may be enhanced in a particular case by connecting it to ground through a capacitor such as the capacitor 230, shown in FIG. 5.

The unit 232 is a flip-flop type J-K which serves in this circuit as a divider. The clock input of the flip-flop is connected to terminal 3 of the 555 timer device. The terminal connection shown in FIG. 5 assumes that the device 232 is a type SN 7473 dual J-K flip-flop. There are two in the package. Both are used to perform a "divide-by-four" function. Terminals 2, 4 and 6 are connected to the positive line. Terminal 11 is connected to negative line 218. Terminals 3, 5 and 12 are connected together. Terminals 9 and 10 are connected to the control electrode of a triac 240 and through a resistor 241 to line 116. Terminals 7 and 8 of the flip-flop are connected to the control electrode of a triac 242 and to the line 116 through a resistor 243. Triac 240 is connected in series with a diode 244 from line 219 to an output line 246. The triac 242 is connected in series with a diode 248 between the common line 219 and the output line 246. Two diodes, 245 and 246, are connected in parallel, in opposite directions of polarity, between common line 219 and negative line 218. Their function is to cancel the potential voltage at terminals 7 through 10 of the flip-flop at low signal to ensure that the triacs will turn off.

Figure 6:
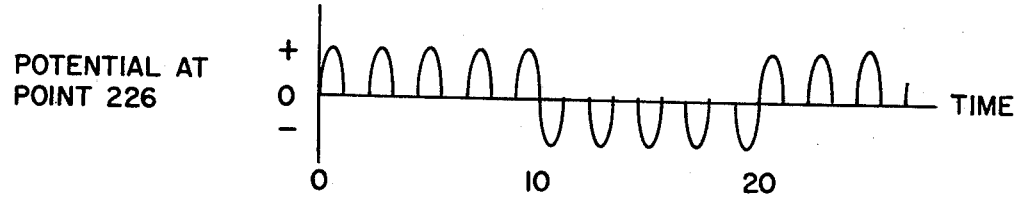
FIGS. 6 and 7 are graphs illustrating the variation in time of the potential applied to the electrochemical processing unit in the system of FIG. 1 and the apparatus of FIG. 5, respectively.

Output line 246 is connected to one terminal 224 of an electrochemical processing unit, generally designated 250, and which comprises a series of plates such as have been described above. Terminal 224 is connected to one set of those plates and the other set of plates is connected to terminal 226. That terminal is connected to the secondary winding 204 at the side opposite negative line 218. Diodes 244 and 248 are connected in opposite directions of polarity. They will conduct on opposite half cycles of the supply power input, but they will be conductive only if a high signal is applied to the control element of their respectively associated triacs. When a high appears at the terminals 9 and 10 of flip-flop device 232, the triac 240 will be rendered conductive and it will conduct current when the rectifier 244 conducts current. It will conduct current when the upper end of secondary winding 204 is positive with respect to the lower end. That circumstance is shown in FIG. 6. When the flip-flop reverses so that a low appears at terminals 9 and 10, the triac 240 will be rendered non-conductive. A high signal will appear at the terminals 7 and 8 and that is applied to the triac 242 so that that triac is rendered conductive each time that current is permitted to flow through rectifier 248. Current will flow through that circuit comprised by rectifier 248 and triac 242 when the triac is turned on and the lower terminal of the secondary winding 204 is positive. In that circumstance, the potential appearing at terminal 226 is negative.

It has been assumed that the output of the divider flip-flop 232 is one-fifth of the supply power frequency. In that circumstance, the wave shape of voltage at circuit point 226 will be formed by five half-wave rectified waves during the period when the flip-flop has one state. The flip-flop changes state and the potential applied to electrochemical unit is reversed and the voltage appearing at circuit point 22 is described by five successive negative half-waves. Thereafter, the flip-flop changes state again, and the cycle is repeated.

In FIG. 5, the numeral 270 represents a bimetallic ion generator comparable to the ion generator 20 of FIG. 1. It, too, is placed so that the field to which it is subjected is modified as a consequence of field reversal in the electrochemical processing plate structure. Again, that feature is not essential, but is preferred. The effect of using a J-K flip-flop in combination with the 555 timer device is to ensure that the high and low periods in the cycle of flip-flop operation have equal duration.

The two light emitting diodes 250 and 252 are included to provide an indication that the electrical unit is functioning. Each is connected in series with a current limiting resistor from a respectively associated triac to ground line 218.

Although I have shown and described certain specific embodiments of my invention, I am fully aware that many modifications thereof are possible. My invention, therefore, is not to be restricted except insofar as is necessitated by the prior art.

I claim:

1. In an apparatus for destroying algae in pool water:
   a flowpath for pool water;
   a plurality of plates made of titanium metal and disposed in said flowpath and spaced such that pool water flows between said plates in pairs;
   means for connecting said pairs of said plates to a source of electrical potential such that one plate of each pair is made electrically positive with respect to the other plate of each pair;
   means for reversing the relative polarity of the plates of a pair;
   a quantity of copper and a quantity of silver joined together to form an electrochemical junction and both disposed in said flowpath such that pool water is made to contact both the copper and the silver; and
   means for preventing flow of pool water over said junction.

2. The invention defined in claim 1 in which the quantity of copper and silver is disposed in an electric field such that there is a potential gradient between them.

3. In an apparatus for destroying algae in pool water:
   a flowpath for pool water;
   a plurality of plates made of titanium metal and disposed in said flowpath and spaced such that pool water flows between said plates in pairs;
   means for connecting said pairs of said plates to a source of electrical potential such that one plate of each pair is made electrically positive with respect to the other plate of each pair;
   means for reversing the relative polarity of the plates of a pair;
   a quantity of copper and a quantity of silver joined together to form an electrochemical junction and both disposed in said flowpath such that pool water is made to contact both the copper and the silver;
   means for preventing flow of pool water over said junction;
   the quantity of copper and of silver being disposed in an electric field such that there is a potential gradient between them; and
   said flowpath being formed by a housing comprising a body portion the interior wall of which defines a cavity and an inlet element and an outlet element through which communication may be had to said cavity;

the interior walls of said body portion being formed with conformations arranged to hold adjacent ones of said plates in fixed spaced relation to one another and to hold said interconnected quantities of copper and silver in fixed spaced relation to said plates.

4. The invention defined in claim 3 in which said inlet and outlet elements comprise conduits arranged to extend in like direction from said body on substantially parallel axes;

said outlet elements terminating at their respective outer ends in an attachment means for attachment to a flow conduit of a swimming pool water circulation system.

5. The invention defined in claim 4 in which said attachment means is formed by a barrier extending along the edge at one side of the respectively associated conduit opening.

6. The invention defined in claim 5 in which each of said inlet and outlet conduits is provided with a plurality of surface conformations the form of serations adapted to engage the interior of a flexible conduit end.

7. The invention defined in claim 6 in which said serations are formed on opposite sides of the mid-region along the length of said inlet and outlet conduits such that those on the side toward said body are adapted to hold one end of a flexible tube and those on the side toward said attachment means are adapted to hold the other end of said flexible tube.

* * * * *